US012676369B2

(12) United States Patent
Rubino et al.

(10) Patent No.: US 12,676,369 B2
(45) Date of Patent: Jul. 7, 2026

(54) MINIATURE ELECTRICAL ENERGY POWER SOURCE HOUSED IN A CASING FORMED FROM AN INTERMEDIATE CERAMIC RING MICRO-BONDED TO UPPER AND LOWER PLATE-SHAPED CERAMIC WAFERS

(71) Applicant: Greatbatch Ltd., Clarence, NY (US)

(72) Inventors: Robert S. Rubino, Williamsville, NY (US); David Dianetti, Lancaster, NY (US); Jeffrey Salzmann, Lancaster, NY (US); Adrish Ganguly, Clarence, NY (US)

(73) Assignee: Greatbatch, LTD., Clarence, NY (US)

(*) Notice: Subject to any disclaimer, the term of this patent is extended or adjusted under 35 U.S.C. 154(b) by 718 days.

(21) Appl. No.: 18/121,216

(22) Filed: Mar. 14, 2023

(65) Prior Publication Data

US 2023/0299401 A1    Sep. 21, 2023

Related U.S. Application Data

(60) Provisional application No. 63/321,124, filed on Mar. 18, 2022.

(51) Int. Cl.
*H01M 50/191* (2021.01)
*H01G 11/28* (2013.01)
(Continued)

(52) U.S. Cl.
CPC .......... *H01M 50/191* (2021.01); *H01G 11/28* (2013.01); *H01G 11/70* (2013.01); *H01G 11/82* (2013.01); *H01G 11/84* (2013.01);

*H01M 6/40* (2013.01); *H01M 10/0525* (2013.01); *H01M 10/058* (2013.01); *H01M 10/24* (2013.01);
(Continued)

(58) Field of Classification Search
CPC .. H01M 50/191; H01M 6/40; H01M 10/0525; H01M 10/058; H01M 10/24; H01M 10/28; H01M 10/30; H01M 10/345; H01M 50/184; H01M 50/562; H01G 11/28; H01G 11/70; H01G 11/82; H01G 11/84;
(Continued)

(56) References Cited

U.S. PATENT DOCUMENTS

| | | | |
|---|---|---|---|
| 6,984,468 | B2 | 1/2006 | Rubino et al. |
| 7,022,146 | B2 | 4/2006 | Rubino et al. |

(Continued)

*Primary Examiner* — Matthew T Martin
*Assistant Examiner* — Bartholomew A Hornsby
(74) *Attorney, Agent, or Firm* — Michael F Scalise

(57) ABSTRACT

An electrical energy power source comprises a casing made by micro-bonding an upper ceramic wafer and a lower ceramic wafer to the opposed surfaces of a ceramic ring. The upper and lower ceramic wafers have respective first and second conductive pathways extends therethrough. A first current collector supporting a first active material layer contacts the upper ceramic wafer and the first conductive pathway, and a second current collector supporting a second, opposite polarity active material layer contacts the lower ceramic wafer and the second conductive pathway. A separator resides between the first and second active materials, and an electrolyte filled into the casing through a fill port activates the active materials. The first and second conductive pathways serve as opposite polarity terminals for the power source.

21 Claims, 4 Drawing Sheets

(51) Int. Cl.

| | |
|---|---|
| *H01G 11/58* | (2013.01) |
| *H01G 11/70* | (2013.01) |
| *H01G 11/82* | (2013.01) |
| *H01G 11/84* | (2013.01) |
| *H01M 6/40* | (2006.01) |
| *H01M 10/0525* | (2010.01) |
| *H01M 10/058* | (2010.01) |
| *H01M 10/24* | (2006.01) |
| *H01M 10/28* | (2006.01) |
| *H01M 10/30* | (2006.01) |
| *H01M 10/34* | (2006.01) |
| *H01M 50/184* | (2021.01) |
| *H01M 50/562* | (2021.01) |

(52) U.S. Cl.
CPC ........... *H01M 10/28* (2013.01); *H01M 10/30* (2013.01); *H01M 10/345* (2013.01); *H01M 50/184* (2021.01); *H01M 50/562* (2021.01); *H01G 11/58* (2013.01)

(58) Field of Classification Search
CPC ........ H01G 11/58; H01G 11/06; H01G 11/78; Y02E 60/10
See application file for complete search history.

(56) References Cited

U.S. PATENT DOCUMENTS

| | | | | |
|---|---|---|---|---|
| 10,770,698 B1 * | 9/2020 | Seitz | ................... | H01M 50/128 |
| 10,957,884 B1 | 3/2021 | Dianetti et al. | | |
| 11,075,421 B1 | 7/2021 | Rubino et al. | | |
| 11,114,714 B2 | 9/2021 | Rubino et al. | | |
| 11,251,480 B2 | 2/2022 | Rubino et al. | | |
| 11,509,011 B2 | 11/2022 | Rubino et al. | | |
| 11,588,171 B2 | 2/2023 | Seitz et al. | | |
| 2008/0032236 A1 * | 2/2008 | Wallace | .............. | H01M 10/056 |
| | | | | 430/319 |
| 2020/0388796 A1 * | 12/2020 | Rubino | .............. | H01M 50/157 |
| 2021/0111382 A1 * | 4/2021 | Rubino | .............. | H01M 50/559 |
| 2021/0167471 A1 * | 6/2021 | Nishide | .............. | H01M 50/122 |
| 2021/0399367 A1 | 12/2021 | Palazzo et al. | | |
| 2022/0013876 A1 | 1/2022 | Baumer et al. | | |
| 2022/0085473 A1 | 3/2022 | Arellano et al. | | |
| 2022/0166095 A1 | 5/2022 | Dianetti et al. | | |
| 2022/0376290 A1 | 11/2022 | Seitz et al. | | |
| 2022/0384883 A1 | 12/2022 | Rubino et al. | | |

\* cited by examiner

```
┌─────────────────────────────────┐
│   FUSED SILICA WAFER WITH        │
│   VIA FORMED BY LASER            │──── 100
│   INDUCED ETCHING                │
└─────────────────────────────────┘
              │
              ▼
┌─────────────────────────────────┐
│   SEED LAYER DEPOSITION          │──── 102
└─────────────────────────────────┘
              │
              ▼
┌─────────────────────────────────┐
│   INSERTION OF PRECIOUS METAL    │──── 104
│   PASTE                          │
└─────────────────────────────────┘
              │
              ▼
┌─────────────────────────────────┐
│   PASTE SINTERING                │──── 106
└─────────────────────────────────┘
              │
              ▼
┌─────────────────────────────────┐
│   SEED ETCH OR                   │──── 108
│   CHEMICAL-MECHANICAL POLISH     │
└─────────────────────────────────┘
```

FIG. 3

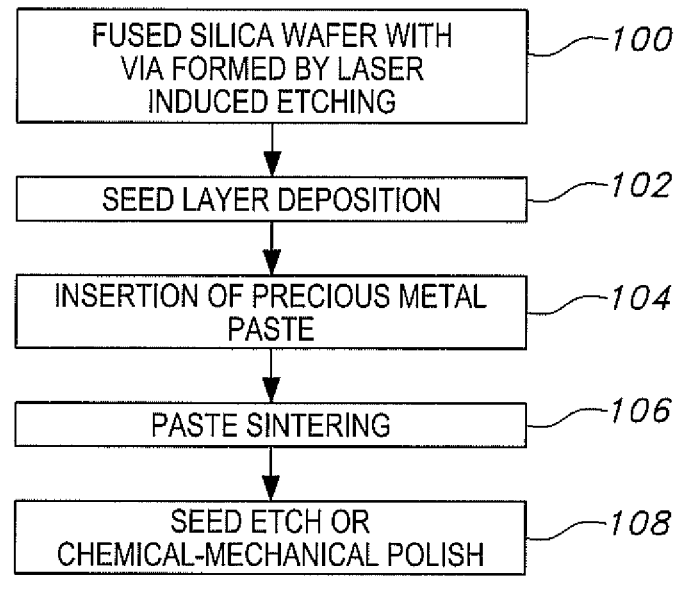

FIG. 4

MINIATURE ELECTRICAL ENERGY POWER SOURCE HOUSED IN A CASING FORMED FROM AN INTERMEDIATE CERAMIC RING MICRO-BONDED TO UPPER AND LOWER PLATE-SHAPED CERAMIC WAFERS

CROSS-REFERENCE TO RELATED APPLICATION

This application claims priority to U.S. Provisional Application Ser. No. 63/321,124, filed on Mar. 18, 2022.

BACKGROUND OF THE INVENTION

1. Field of the Invention

The present invention relates to the conversion of chemical energy to electrical energy. More particularly, the present invention relates to an electrical energy power source, for example, a primary or a secondary electrochemical cell. While there are no limits to the shape of the power source, the electrical energy power source preferably has a total size or volume that is less than 0.5 cc. Such so-called miniature-sized electrical energy power sources enable numerous new and improved medical device therapies. Miniature electrical energy power sources are defined as those having a size or total volume that is less than 0.5 cc.

The present invention offers a solution to current implantable electrical energy power source size limitations by forming the power source casing by micro-bonding opposed transparent ceramic wafers, for example, high-purity fused silica plate-shaped wafers to an intermediate ceramic ring, for example, a high-purity fused silica ring. Conductive pathways extending through the opposed plate-shaped wafers are connected to thin-film opposite polarity current collectors that in turn are in electrical continuity with the anode and the cathode. A separator segregates the anode from physical contact with the cathode. A third via in one of the opposed fused silica wafers serves as an electrolyte fill port.

2. Prior Art

One approach that has been widely used to make miniature electrochemical cells is thin film technology where the opposite polarity electrodes are deposited by physical vapor deposition (PVD) and activated with a solid electrolyte. This is an attractive approach since there is no manual handling of miniature parts and the manufacturing process is well suited to automated production using a pick-and-place semiconductor-type approach.

However, one drawback of thin film electrochemical cells is that the electrodes are non-porous, which means that the reaction rate is limited by solid-state diffusion of ions through the active layers. Solid-state diffusion limits the active electrode thickness to about 10 to about 20 microns, which equates to typical capacities of about 75 to about 100 $\mu Ah/cm^2$. This capacity range means that there is generally not enough area available in many medical and non-medical devices to provide sufficient capacity to power the device.

Alternate approaches developed by Greatbatch Ltd., Clarence, New York, are the hermetic coin cells shown in U.S. Pub. Nos. 2022/0085473 to Arellano et al. and 2022/0166095 to Dianetti et al. The electrochemical cell configurations described in those publications can provide over 2,000 $\mu Ah/cm^2$. However, even that capacity may not provide enough energy density for some medical device applications. A significant drawback is that the area available for the electrodes is reduced by the glass-to-metal seal which results in an effective casing wall thickness of about 625 $\mu m$ around the circumference. According to the present invention, it is desired to minimize the casing wall thickness to about 100 $\mu m$ around the circumference in order to increase the cell's capacity to >4000 $\mu Ah/cm^2$.

Further, the glass-to-metal seal of the cell designs described in the '473 and '095 publications is most reliable in a cylindrical shape. However, it is desired to have a design that can be made in any shape including those that are not cylindrical in order to maximize the utilization of space within the medical device being powered by the miniature electrical energy power source of the present invention.

Finally, the cell designs described in the '473 and '095 publications require precision machining and assembly of the individual parts that are assembled into the cells. For scale-up to very high volumes, an array-type approach using host sheets is desired where parts are handled and produced simultaneously.

SUMMARY OF THE INVENTION

Construction of an electrical energy power source according to the present invention begins with three optically transparent ceramic plate-shaped host sheets. An optically transparent ceramic is defined as having a transmission of >90% at a wavelength that ranges from about 300 nm to about 1,500 nm. One host sheet is designated the first host sheet from which a plurality of plate-shaped upper wafers will be cut. The second host sheet is designated the lower host sheet from which a plurality of plate-shaped lower wafers will be cut. The third host sheet is somewhat thicker than the first and second host sheets and is designated the intermediate host sheet from which a plurality of intermediate ceramic rings will be cut. After various processing steps, which will be described in detail hereinafter, the upper and lower host sheets are micro-bonded to the upper and lower surfaces of the intermediate host sheet in alignment with openings that have been laser cut into the intermediate sheet. The stacked upper, intermediate, and lower host sheets are then laser cut around the periphery of the intermediate opening to form upper and lower plate-shaped wafers closing an intermediate ceramic ring. That way, the intermediate ceramic ring closed by the upper and lower ceramic wafers forms a casing which contains the electrode assembly for an electrical energy power source.

Specifically, suitable optically transparent ceramics have a transmission of >90% at the wavelength of the laser that is used to process the first, second and third host sheets into the shapes that are desired to form a casing. Exemplary optically transparent ceramics include high-purity fused silica, crystalline sapphire, and other biocompatible equivalent transparent ceramics. The thickness of the upper and lower host sheets is ≤100 $\mu m$ but is desirably only as thick as necessary to provide the required mechanical strength. Thicker ceramic sheets can be polished down to the desired thickness to minimize the power source volume after or during assembly using a combination of lapping and chemical mechanical polishing. Such processes are well known in the art.

The upper host ceramic sheet contains a plurality of conductive pathways serving as positive terminals while the lower host ceramic sheet contains a plurality of conductive pathways serving as negative terminals corresponding to the plurality of cells that will be manufactured from the stacked and aligned host sheets. To form the conductive pathways serving as the opposite polarity terminals, a desired plurality of hermetic vias is formed in each of the upper and lower host sheets. These vias are aligned in the center of the individual plate-shaped wafers that will subsequently be cut from the respective host sheets. The vias are formed by laser etching holes having a diameter in the range of about 40 μm to about 500 μm through the sheets.

Laser-induced etching of the host sheets is a two-step process which results in a straight walled through hole. The first step structurally modifies the ceramic material through exposure to laser radiation. The laser spot size is focused in order to exceed the ceramic material's threshold for absorbed energy density. The pulse width duration is about 300 fs to about 10,000 fs, with a repetition rate of about 250 kHz to about 800 kHz. Targeted regions of the ceramic host sheets are irradiated, leaving no significant residual heat between pulses. This lack of heating prevents the formation of cracks, and the like, in the host sheets, which is necessary for a hermetic conductive pathway in the vias.

After the upper and lower ceramic host sheets have been selectively modified by laser irradiation, the host sheets are immersed in a chemical etchant. A suitable etchant is comprised of a solution of hydrofluoric acid (which offers lower selectivity), or a caustic solution such as 30% w/w potassium hydroxide. Due to the laser-exposed modification of the host ceramic material, the laser irradiated regions are removed at a much higher rate than the unexposed regions. The removal rate can be increased by heating the etchant bath to a temperature ranging from about 50° C. to about 90° C. and by application of ultrasonic or megasonic agitation. After laser etching, chemical residue on the host ceramic sheets is neutralized with a standard semiconductor cleaning solution, followed by rinsing in ultra-pure water.

In order to fabricate a hermetic and electrically conductive pathway through the vias in the upper and lower host sheets, a metal layer is first applied that fully covers the sheets including the sidewalls of the vies, leaving no voids. This so-called metal "seed" layer is selected from titanium, gold, copper, platinum, and platinum alloys, which are biocompatible and have suitably low resistivity. Due to its ability to bond effectively to ceramic, titanium is a preferred seed material. Regardless, the seed layer is applied as a blanket deposition using deposition techniques such as plasma sputtering, magnetron sputtering, electron-beam evaporation, or atomic layer deposition. Suitable thicknesses for the seed layer range from about 0.1 nm to about 2 μm.

The upper and lower host ceramic sheets with the deposited seed layers covering the arrays of vies are then subjected to a via fill process. Gold, Au/Pt alloy, copper and rhodium are preferred for filling the vias to provide electrically conductive pathways through the upper and lower host ceramic sheets. Electrolytic plating is a suitable via fill process where the seed plated holes are exposed by traditional photolithography. In order to prevent voids, seams, and cracks in the plated material, ultrasonic agitation or surfactants may be used. Other methods include paste dispensing and screen printing. The resulting cylindrically-shaped vias are dimensionally defined by the thickness of the upper and lower host sheets and the diameter of the through hole formed by laser induced etching. If desired, subsequent thermal processing is limited to ≤350° C.

After the electrically conductive material is deposited into the vias in the upper and lower host sheets, the photoresist is removed. For example, a gold seed layer can be removed from the surface of a host sheet by etching with a 30-60% (w/w) potassium iodide solution at a temperature ranging from about 25° C. to about 80° C. However, it is within the scope of the present invention that the upper and lower seed layers can be selectively removed using off-the-shelf etchants or chemical mixtures, which are described in the literature. An alternative method uses a chemical-mechanical polish to remove the seed layers and simultaneously planarize the vias with via arrays ranging from 100 to 1,000 per host sheet, depending on the application.

Current collectors are then deposited on the inner surfaces of each of the upper and lower host sheets. The current collectors are aligned with the previously formed conductive pathways extending through the host vias. While any metal that is stable at 4.3 V versus lithium is suitable for the current collectors, titanium or aluminum are preferred for the cathode current collectors and copper is suitable for the anode current collectors. Current collector thicknesses range from about 0.1 μm to about 100 μm. In addition to functioning to transfer current from the to-be-deposited cathode and anode active materials to the conductive pathways serving as the positive and negative terminals, the current collectors serve as non-porous barrier layers that prevent electrolyte from contacting the pathways in the event that the via material is susceptible to corrosion when exposed to the cell environment. If desired, a gold conductive pad supported on a titanium adhesion layer contacted to an outer surface of the upper and lower host sheets is aligned with the conductive pathways extending through the host vias. These metal layers are preferably deposited using PVD and CVD methods known in the art.

The intermediate ceramic rings are cut from the third host sheet in a similar manner as the vias are cut in the upper and lower host sheets by laser irradiation followed by etching. However, in the case of the intermediate ceramic rings, the laser traces out the periphery of the inside diameter of a ring by making a circle with an outside diameter that is equal to the inside diameter of the to-be-built cell casing, thus modifying the third host ceramic sheet in that area for subsequent etching. Once etched, the material inside the laser irradiated hole is removed from the third host sheet by immersing the sheet in a chemical etchant. The thickness of the intermediate host sheet preferably ranges from about 100 μm to about 1000 μm.

Next, the third or intermediate host sheet is laser welded to the second or lower host sheet using a transmission weld that is formed using an ultrashort pulsed laser. Before welding, however, the surface roughness of the ceramic sheets is preferably <1 nm. The ceramic sheets are cleaned using a standard semiconductor cleaning process followed by rinsing in heated ultra-pure water and dried in filtered heated nitrogen.

Following cleaning, the second and third host sheets or the lower and intermediate sheets are assembled together and loaded onto a fixture tray. The loaded sheets secured by top and bottom frames within the fixture are then subjected to pneumatic pressure that is significant enough to ensure optical contact between them. The top weld fixture consists of an optical cover glass that is transparent to the incident laser beam. The weld zone is around the periphery of each to-be-built casing and may be done in multiple spaced-apart passes but should not have an overall width of >150 μm. The incident laser beam applied to the stacked lower and intermediate host sheets penetrates through the transparent cover glass and facilitates interdiffusion of ceramic ions at the interface of the stacked sheets. Critical laser bonding parameters include the laser beam spot size, the numerical aperture (NA), the focal length, the pulse energy, the pulse width, the frequency, and the focal length. Suitable hermetic bonds are achieved using a laser with a spot size of about 1 μm to about 10 μm, a NA of about 0.2 to about 0.8, a focal length of about 10 mm to about 30 mm, a pulse energy of about 30 μJ to about 50 μJ, a pulse width of about 400 fs to about 800 fs, and a 200 kHz to 800 kHz frequency with an avg. power of about 10 W to about 15 W in the wavelength range of about UV 355 nm to IR 1030 nm, with the source being a Bessel-like beam.

In a separate manufacturing line, the opposite polarity electrodes are laser cut or punched from sheets of anode and cathode active material to the desired shape. After the intermediate and lower host sheets have been micro-bonded together, an individual anode layer is adhered to the lower host sheet inside one of the intermediate rings, aligned with the conductive pathway serving as the negative terminal. This is done using a conductive carbonaceous paste composed of carbon black and a polymeric binder. Graphite, silicon, and lithium titanium oxide are also suitable anode materials for a secondary electrical energy power source. The anode thickness ranges from about 50 μm to about 500 μm. In the case of a primary electrochemical cell, lithium is an exemplary anode active material. In the event that the anode active material is not lithium, the active material is preferably combined with a conductive carbon and a polymeric binder, such as PVDF, carboxymethyl cellulose, styrene-butadiene rubber. Anodes for a primary electrochemical cell are cut or punched from a sheet of lithium or lithium alloy. Anodes for a secondary cell are cut or punched from sheets that are formed as a slurry of the anode active material mixed with the conductive carbon and polymeric binder constituents in a solvent to make an anode active slurry or paste that is then tape cast, extruded, or coated by any method. After drying, the resulting porous secondary anodes are pressed to a final porosity of about 20% to about 40%.

Similarly, cathodes for a secondary electrochemical cell are adhered to the upper host sheet aligned with the conductive pathways serving as the positive terminals using a conductive carbonaceous paste. The cathode layer thickness is about 50 μm to about 500 μm. Exemplary cathode active materials for a secondary electrochemical cell include lithium cobalt oxide, lithium nickel cobalt manganese oxide, lithium iron phosphate, and lithium nickel cobalt aluminum oxide. For a primary electrochemical cell, silver vanadium oxide, carbon monofluoride or manganese dioxide are preferred. The active material particles are preferably combined with a conductive carbon and a polymeric binder, such as PVDF, carboxymethyl cellulose, or styrene-butadiene rubber. Sheets from which cathodes are cut or punched are formed from a slurry of the cathode active material mixed with the conductive carbon and polymeric binder constituents in a solvent to make a cathode active slurry or paste that is then tape cast, extruded, or coated by any method. After drying, the resulting porous cathodes are pressed to a final porosity of about 20% to about 40%.

Individual separators are cut from a sheet to fit into the casing defined by the inside diameter of the intermediate ceramic rings that have been cut into the third host sheet. An individual separator is placed inside one of the rings on top of an anode. Exemplary separators are comprised of a porous polymeric material such as polyethylene or a polyethylene/polypropylene composite.

The upper host sheet supporting the cathodes is then brought into contact with the upper surface of the intermediate host sheet to align the cathodes with a respective ring-shaped opening in the intermediate sheet. This completes the casing assembly stack. The upper host sheet is then laser welded to the intermediate host sheet using a transmission weld with an ultrashort pulsed laser in a similar manner as was used to weld the intermediate and lower host sheets together. The weld zone is around the periphery of each casing. The weld may have multiple spaced-apart passes but should not have an overall width that is >150 μm.

The upper host sheet is also provided with a third via that is spaced from the first conductive pathway in the first via serving as the positive terminal. The third via serves as an electrolyte fill port for filling each casing with an activating electrolyte. The fill port is preferably provided by forming a respective plurality of additional third conductive pathways through the upper host sheet. One of these third conductive pathways is aligned with each of the plate-shaped wafers that will subsequently be cut from the upper, intermediate, and lower host sheets to form the casing for an individual electrical energy power source, followed by drilling a hole through the third conductive pathway using a laser or by mechanical milling. A suitable electrolyte is a non-aqueous solution containing a lithium salt dissolved in a mixture of solvents including at least one low viscosity solvent and at least one high permittivity solvent.

After filling each casing with electrolyte through its fill port, the fill port is close-welded by melting and re-flowing the metal of the conductive pathway using a laser. Alternately, a metallic plug is inserted into the fill port and welded to the metallic material comprising the conductive pathway in the via.

In yet another approach, instead of forming a third conductive pathway, a hole is drilled by laser or mechanical milling into the upper ceramic sheet in alignment with each casing that will subsequently be cut from the upper, intermediate, and lower host sheets. After filling the casing with electrolyte, this hole is filled with a transparent ceramic plug that is laser welded to the upper ceramic sheet.

After electrolyte filling, the electrical energy power sources are subjected to an appropriate electrical test depending on their chemistry.

Individual electrical energy power sources are then singulated from the stacked and weld-connected upper, intermediate, and lower host sheets to provide power sources with about a 2.5 mm diameter and about a 0.7 mm height. The resulting wall thickness is about 100 μm, which is substantially less than the 625 μm seal of the prior art cells described in the previously discussed U.S. Pub. Nos. 2022/0085473 to Arellano et al. and 2022/0166095 to Dianetti et al. The efficient packaging of the electrical energy power sources according to the present invention results in a delivered capacity of about 300 μAh, or more.

These and other aspects of the present invention will become increasingly more apparent to those skilled in the art by reference to the following detailed description and to the appended drawings.

BRIEF DESCRIPTION OF THE DRAWINGS

FIG. 3 illustrates a process flow chart for providing an electrically conductive pathway extending through a high-purity fused silica wafer according to the present invention.

FIG. 4 is a schematic drawing showing an assembly of a high-purity fused silica wafer 18 or 20 stacked on top of a high-purity fused silica ring 16 for subsequent micro-bonding to each other according to the present invention.

DETAILED DESCRIPTION OF THE PREFERRED EMBODIMENTS

As described in this specification, a high-purity fused silica wafer is commercially available from numerous manufacturers. A suitable high-purity fused silica wafer has a thickness that ranges from about 100 μm to about 4 mm. One source is Corning, Incorporated, Corning, New York under the designations 7979, 7980 and 8655, designation 7980 being preferred.

As described in this specification, the term "plurality" means more than two up to a large number.

Figure 1:
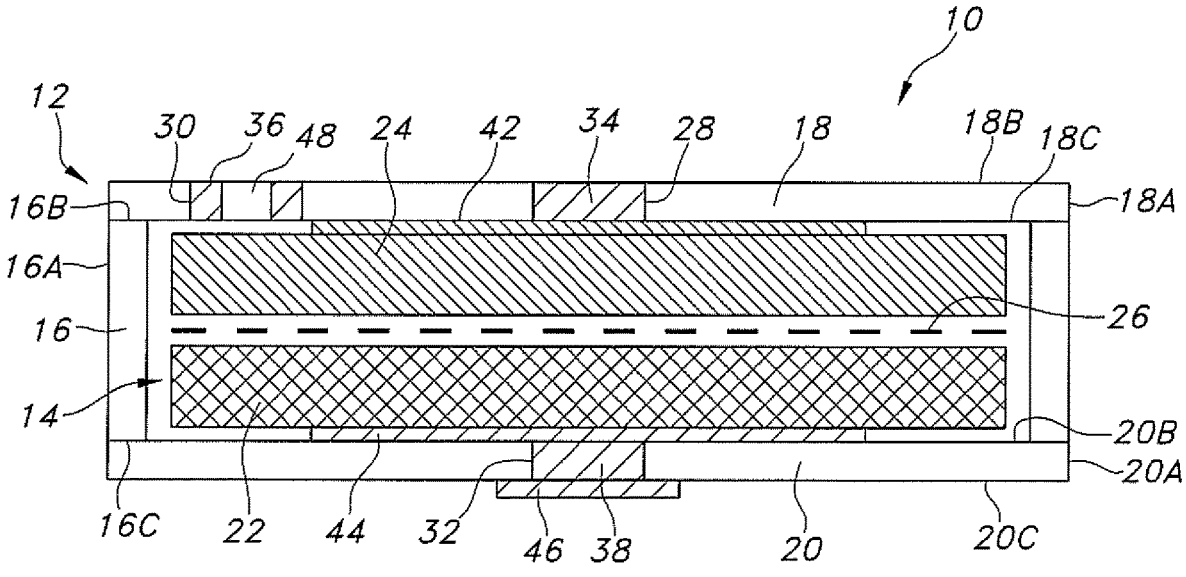
FIG. 1 is a cross-sectional view of an exemplary electrical power source 10 according to the present invention.

Turning now to the drawings, FIG. 1 is a cross-sectional view of an exemplary electrical energy power source 10 according to the present invention. The electrical energy power source 10 can be a capacitor or a rechargeable battery, for example a hermetically sealed rechargeable Li-ion battery. However, the electrical energy power source 10 is not limited to any one chemistry or even a rechargeable chemistry and can be of an alkaline cell, a primary lithium cell, a rechargeable lithium-ion cell, a Ni/cadmium cell, a Ni/metal hydride cell, a supercapacitor, a thin film solid-state cell, and the like. Preferably, the electrical energy power source 10 is a lithium-ion electrochemical cell comprising a carbon-based or $Li_4Ti_5O_{12}$-based anode and a lithium metal oxide-based cathode, such as of $LiCoO_2$ or lithium nickel manganese cobalt oxide ($LiNi_aMn_bCo_{1-a-b}O_2$). The electrical energy power source 10 can also be a solid-state thin film electrochemical cell having a lithium anode, a metal-oxide based cathode and a solid electrolyte, such as an electrolyte of LiPON ($Li_xPO_yN_z$).

The electrical energy power source 10 comprises a casing 12 housing an electrode assembly 14. The casing 12 comprises an intermediate ceramic ring 16 that is micro-bonded to a first or upper plate-shaped ceramic wafer 18 and a second or lower plate-shaped ceramic wafer 20. The electrode assembly 14 housed inside the casing 12 comprises an anode active material 22 that is prevented from physically contacting a cathode active material 24 by an intermediate separate 26.

In greater detail, the first or upper plate-shaped ceramic wafer 18 is preferably a first high-purity fused silica wafer comprising an annular peripheral edge 18A that extends to and meets with a planar upper major face 18B spaced from a planar lower major face 18C. Similarly, the second or lower plate-shaped ceramic wafer 20 is preferably a second high-purity fused silica wafer comprising an annular peripheral edge 20A that extends to and meets with a planar upper major face 20B spaced from a planar lower major face 20C. The intermediate ceramic ring 16 is preferably a high-purity fused silica ring that resides between the upper and lower plate-shaped ceramic wafers 18 and 20. The ceramic ring 16 comprises an annular sidewall 16A that extends to and meets with an upper ring-shaped surface 16B spaced from a lower ring-shaped surface 16C. The upper and lower ring-shaped surfaces 16B and 16C of the intermediate ring 16 are planar, residing along respective planes.

As further shown in FIG. 1, a first via 28 and a third via 30 are formed in the first or upper ceramic wafer 18 and a second via 32 is formed in the second or lower ceramic wafer 20. The first and third vias 28 and 30 extend through the thickness of the first ceramic wafer 18 from the upper major face 18B to the lower major face 18C. The first via 28 is generally centered in the wafer 18 while the third via 30 is off-set toward the annular peripheral edge 18A. The second via 32 extends through the thickness of the second ceramic wafer 20 from the upper major face 20B to the lower major face 20C and is generally centered in the second wafer. The vias 28, 30 and 32 are preferably cylindrically-shaped openings, each having a diameter that ranges from about 40 μm to about 250 μm.

As depicted in the process flow chart of FIG. 3, the via formation process includes first laser etching the first and second ceramic wafers 18 and 20 where the vias are desired (step 100 in FIG. 3). This is a two-step process. The first step structurally modifies the ceramic wafer 18, 20 by exposing it to laser radiation. For example, it is known that high-purity fused silica has a relatively low light radiation absorbance with radiation wavelengths ranging from about 0.1 μm to 11 μm. The laser spot size is focused on the wafers 18, 20 at the desired locations in order to exceed the fused silica's threshold for absorbed energy density. The pulse width duration ranges from about 300 fs to about 10,000 fs with a repetition rate ranging from about 250 kHz to about 800 kHz. Laser-induced etching of a high-purity fused silica wafer does not cause any significant residual heat in the wafer between pulses. This lack of residual heat makes laser etching an appropriate technique as it prevents the formation of cracks or similar types of damage in the wafers 18 and 20. A high-purity fused silica wafer having a via that is devoid of cracks, and the like, is necessary for forming a hermetic conductive pathway in the via. The resulting cylindrically-shaped vias 28, 30 and 32 are dimensionally defined by the thickness of the first ceramic wafer 18 measured from the upper to the lower major faces 18B, 18C thereof and the thickness of the second ceramic wafer 20 measured from the upper to the lower major faces 20B, 20C thereof. The diameter of the vias is defined by the previously described laser-induced etching process. If subsequent thermal processing of one the wafers 18, 20 is required, the wafers 18, 20 are heated to a temperature that is limited to less than 350° C.

After the high-purity fused silica wafers 18, 20 have been exposed to laser-induced etching radiation, the wafers 18, 20 are immersed in a chemical etchant. The etchant is a solution of hydrofluoric acid or a caustic solution, for example, of about 30%, by wt., potassium hydroxide. Due to the laser-exposed modification of the ceramic wafers 18, 20, the laser exposed regions are removed in the etchant bath at a much higher rate than unexposed regions. Selectivity, which is defined as the ratio of material removal from the laser-induced etching exposed regions in comparison to the unexposed regions, is higher with the caustic etch solution. The removal rate can be increased by heating the etchant bath to a temperature that ranges from about 50° C. to about 90° C. along with the application of ultrasonic or megasonic agitation of the bath.

Following the etching step, chemical residue on the ceramic wafers 18, 20 is neutralized with a standard semiconductor cleaning solution, followed by rinsing the wafers in ultra-pure water. To produce a high edge quality via 28, 30 and 32, any debris, asperities, or residual material along the via sidewall is removed using a relatively less-selective etchant, such as hydrofluoric acid. The ceramic wafers 28 and 20 provided with the respective vies 28, 30 and 32 are then subjected to a standard semiconductor cleaning using a solution of two commercially available detergents mixed with ultra-pure water.

FIGS. 2A to 2D and the flow chart of FIG. 3 relate to forming the electrically conductive pathways 34 and 36 extending through the respective first and third vias 28, 30 in the first ceramic wafer 18 and the electrically conductive pathway 38 extending through the second via 32 in the second ceramic wafer 20. The conductive pathways 34, 36 and 38 are formed by first depositing a titanium adhesion layer (not shown) on the ceramic wafer 18, 20 followed by a "seed" layer 40 (step 102 in FIG. 3) at the via using magnetron sputtering. The adhesion and seed layers completely cover the upper and lower faces 18B and 18C of the first fused silica wafer 18 and the upper and lower faces 20B, 20C of the second fused silica wafer 20 including the via sidewalls, leaving no voids. Gold, an Au/Pt alloy, and rhodium are suitable biocompatible metals for the seed layer 40, with pure gold being preferred. In addition to being biocompatible, these metals and alloys have a suitably low resistivity. The thickness of the seed layer 40 ranges from about 0.1 nm to about 2 μm. Preferred techniques for depositing the adhesion layer and the seed layer 40 include plasma sputtering, magnetron sputtering, electron-beam evaporation, or atomic layer deposition.

The ceramic wafers 18, 20 are then subjected to an electroplating process to completely fill the seeded vies 28, 30 and 32 with a conductive material forming respective electrically conductive pathways 34, 36 and 38. Gold, Au/Pt alloy, copper and rhodium are preferred for the electrically conductive pathways 34, 36 and 38, with gold being preferred for pathways 34 and 36 and copper being preferred for pathway 38. In the electrolytic plating process, the ceramic wafers 18 and 20 are coated with a photoresist and then the vias 28, 30 and 32 are exposed by traditional photolithography. In order to prevent voids and seams, ultrasonic agitation or surfactants may be used in the electrolytic plating bath.

An alternate method for providing the representative electrically conductive pathways 34, 36 and 38 is to fill the vies 28, 30 and 32 with a paste or ink of a substantially pure platinum paste (step 104 in FIG. 3). The ceramic wafers 18 and 20 are provided in a brown-state so that sintering is only for the purpose of causing the paste or ink of the platinum-containing material to form a coherent mass by heating the ceramic wafers 18, 20 without melting the paste or ink (step 106 in FIG. 3). The sintered platinum is hermetically sealed to the ceramic comprising the wafers 18, 20 without the aid of a metallization contacting the ceramic in the vias 28, 30 and 32. A paste is defined as a composition having a viscosity that ranges from about $1\times10^5$ to about $1\times10^{10}$ centipoise (cP) while an ink has a viscosity that ranges from about 0.1 cP to about 50,000 cP. A suitable process for forming a platinum-containing conductive pathway in a via extending through a ceramic substrate is described in U.S. Pat. No. 8,653,384 to Tang et al., which is assigned to the assignee of the present invention and incorporated herein by reference.

According to another embodiment of the present invention, in lieu of the substantially pure platinum paste, or ink filled into the vies 28, 30 and 32, the vias are filled with a composite reinforced metal ceramic (CRMC) material. The CRMC material is a platinum-containing material that comprises, by weight %, from about 10:90 ceramic:platinum to about 90:10 ceramic:platinum or, from about 70:30 ceramic:platinum to about 30:70 ceramic:platinum. The ceramic is preferably alumina.

Figure 2A:
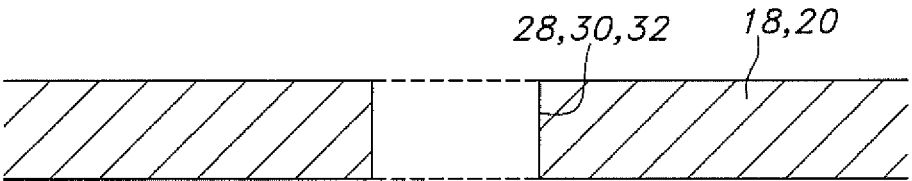
FIGS. 2A to 2D illustrate the steps for providing an electrically conductive pathway 34, 36, 38 extending through a high-purity fused silica wafer 18, 20 according to the present invention.
Figure 2B:
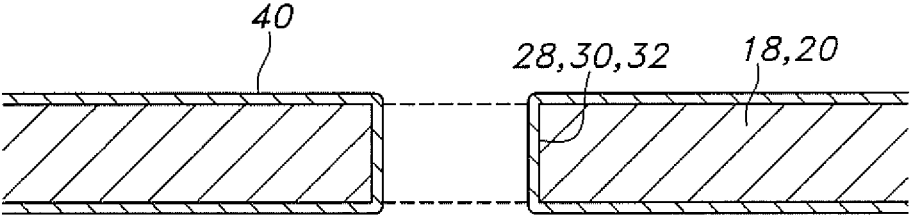
Figure 2C:
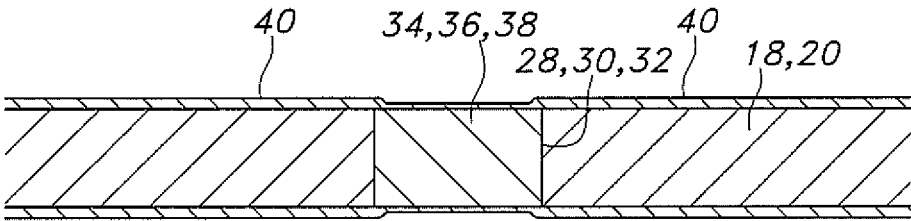
Figure 2D:
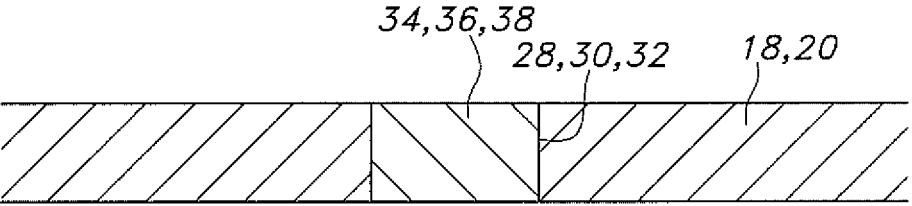

Next, as shown in FIG. 2D, the remaining adhesion layer and the seed layer 40 covering the opposed major faces 18B, 18C of the first ceramic wafer 18 and the opposed major faces 20B, 20C of the second ceramic wafer 20 are removed (step 108 in FIG. 3). This is done by etching the wafers 18, 20 with a 30% to 60%, by wt., potassium iodide solution at a temperature ranging from about 25° C. to about 80° C.

An alternative method for removing the adhesion and seed layers from the opposed major faces 18B, 18C and 20B, 20C is to subject the ceramic wafers 18, 20 to a chemical-mechanical polishing. In addition to removing the adhesion and seed layers, this polishing step simultaneously planarize the electrically conductive pathways 34, 36 and 38 extending through the vias 28, 30 and 32.

In a manufacturing setting as previously described in the Summary of the Invention section of this specification, a typical via array can range from about 100 to about 1,000 vias extending through a host ceramic sheet. The ceramic wafers 18 and 20 depicted in FIG. 1 are then cut out of the host sheets having a shape and size that is suitable for manufacturing the electrical energy power source 10 that is desired for powering an implantable medical device, and the like.

The electrically conductive pathways 34, 36 and 38 extending through the high-purity fused silica wafers 18 and 20 can also be provided by a screen-printing process.

Referring back to FIG. 1, a thin-film cathode current collector 42 is contacted to the lower major face 18C of the first ceramic wafer 18 using physical vapor deposition (PVD). The cathode current collector 42 is preferably a continuous layer of titanium that is devoid of perforations and is in electrical continuity with the electrically conductive pathway 34 residing in the via 28. The titanium current collector 42 has a thickness measured outwardly from the lower major face 18C of the first ceramic wafer 18 that ranges from about 0.1 μm to about 3 μm. Nickel, stainless steel, tantalum, platinum, gold, aluminum, cobalt, molybdenum, a Ti/NiV composite, and alloys thereof are also suitable materials for the cathode current collector 42.

A layer of cathode active material 24 is supported on the cathode current collector 42. The cathode active material 24 preferably extends outwardly beyond the peripheral edge of the current collector 42 but is spaced inwardly from the intermediate ceramic ring 16. The cathode active material 24 is deposited using a physical vapor deposition process and has a thickness that ranges from about 25 μm to about 5,000 μm. Suitable cathode active materials for a secondary electrochemical cell are lithiated metal oxide-based materials, for example $LiCoO_2$, $LiMnO_2$, $LiMn_2O_4$, $LiFePO_4$, $Ag_2V_4O_{11}$, $V_2O_5$ and lithium nickel manganese cobalt oxide ($LiNi_aMn_bCo_{1-a-b}O_2$). In that manner, the conductive pathway 34 serves as a positive-polarity terminal electrically connecting the cathode active material 24 through the cathode current collector 42 to the upper major face 18BC of the first ceramic wafer 18.

In a similar manner, a thin-film anode current collector 44 is contacted to the upper major face 20B of the second ceramic wafer 20 using physical vapor deposition (PVD). The anode current collector 44 is preferably a continuous layer of an electrically conductive material having a thickness measured outwardly from the upper major face 20B of the ceramic wafer 20 that ranges from about 0.1 μm to about 3 μm. Titanium, copper, nickel stainless steel, tantalum, platinum, gold, aluminum, cobalt, molybdenum, a Ti/NiV composite, and alloys thereof are also suitable materials for the anode current collector 44.

If the conductive pathway 38 and current collector 44 are both made of copper, a contact pad 46 of a biocompatible end biostable material is contacted to the lower major face 20C of the second ceramic wafer 20, covering the conductive pathway 38. The contact pad 46 is preferably made of gold and is deposited on the lower ceramic wafer 20 using physical vapor deposition (PVD).

A layer of anode active material 22 is then supported on the anode current collector 44. The anode active material 22 preferably extends outwardly beyond the peripheral edge of the current collector 44 but is spaced inwardly from the intermediate ceramic ring 16 and has a thickness that ranges from about 25 μm to about 4,000 μm. Suitable anode active materials for a primary electrochemical cell include lithium and its alloys and intermetallic compounds including, for example, Li—Si, Li—Sn, Li—Al, Li—B and Li—Si—B alloys, and mixtures and oxides thereof. Carbonaceous materials such as carbon, graphite silicon, lithium titanium oxide are suitable anode materials for a secondary electrical energy power source. In that manner, the conductive pathway 38 serves as a negative-polarity terminal electrically connecting the anode active material 22 through the anode current collector 44 to the lower major face 20C of the second ceramic wafer 20.

As previously described in the Summary of the Invention section of this specification, in a high-volume manufacturing process, the first or upper ceramic wafer 18, the intermediate ceramic ring 16 and the second or lower ceramic wafer 20 are contained in respective ceramic sheets which, after being provided with their respective conductive vias and shaped opening, are micro-bonded together. However, with reference to FIG. 4 and for the sake of simplicity, the micro-bonding process for manufacturing the casing 12 for an electrical energy power source 10 according to the present invention will be described with respect to a single intermediate ceramic ring 16 micro-bonded to a single upper ceramic wafer 18 and a single lower ceramic wafer 20.

Thus, referring now to FIG. 4, following cleaning, the exemplary second high-purity fused silica wafer 20 with the electrically conductive pathway 38 extending therethrough is first mounted on the lower surface 16C of the exemplary intermediate high-purity fused silica ring 16. With the second fused silica wafer 20 and the fused silica ring 16 in registry with each other, the assembly is subjected to a pneumatic pressure that is sufficient to ensure optical contact of the fused silica wafer 20 with the fused silica ring 16. An optical cover glass (not shown) that is transparent to an incident laser beam is positioned in contact with the lower major face 20C of the second fused silica wafer 20, opposite the fused silica ring 16. A laser light directed at the transparent cover glass then penetrates through the cover glass to cause interdiffusion of the respective fused silicas at the interface of the wafer 20 contacting the ring 16.

After the second high-purity fused silica wafer 20 is micro-bonded or micro-welded to the high-purity fused silica ring 16, the resulting subassembly is flipped over, and the first high-purity fused silica wafer 18 with the electrically conductive pathways 34, 36 extending therethrough is mounted on the upper surface 16B of the fused silica ring 16. As with the second fused silica wafer 20 micro-bonded to the fused silica ring 16, the first fused silica wafer 18 in registry with the ring 16 is subjected to a pneumatic pressure that is sufficient to ensure optical contact of the wafer 18 and the ring 16. An optical cover glass (not shown) that is transparent to the incident laser beam is positioned in contact with the upper major face 18B of the first wafer 18, opposite the fused silica ring 16. As before, a laser light directed at the transparent cover glass then penetrates through the cover glass to cause interdiffusion of the respective fused silicas at the interface of the wafer 18 contacting the ring 16.

Critical laser bonding parameters for the laser and its beam include the numerical aperture (NA) of the laser and the spot size, focal length, pulse energy, pulse width, frequency, and focal length of the laser beam. Suitable micro-bonding welds are achieved using a laser with a spot size of about 1 μm to about 10 μm, a numerical aperture (NA) of about 0.2 to about 0.8, a focal length that ranges from about 10 mm to about 30 mm, a pulse energy that ranges from about 30 μJ to about 50 μJ, a pulse width that ranges from about 400 fs to about 800 fs at a frequency that ranges from about 200 kHz to about 800 kHz with an average power that ranges from about 10 W to about 15 W. The laser beam has a wavelength that ranges from ultraviolet light at about 355 nm to infrared radiation (IR) at about 1030 nm. A suitable laser is one that produces a Bessel-like light beam, however, it is noted that the present invention is not limited to the beam source and the specific weld parameters described above. Instead, they are exemplary.

Figure 5:
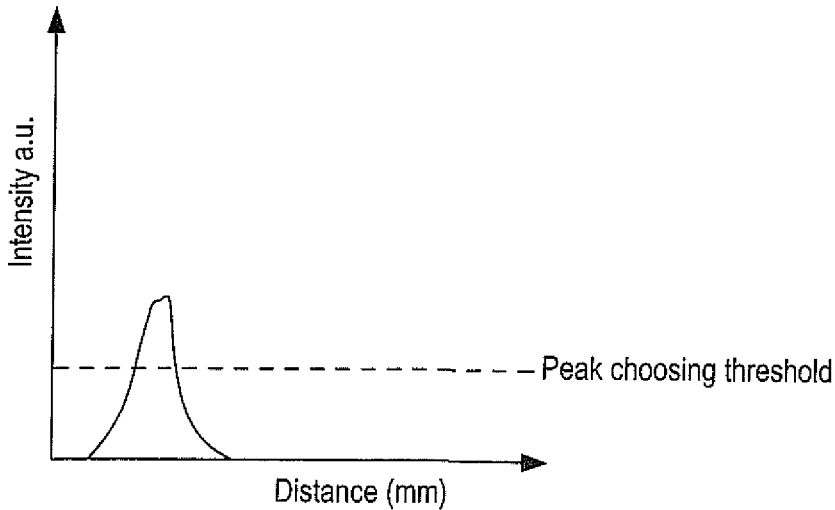
FIG. 5 is a graph showing the difference in the refractive indices between air and high-purity fused silica.

Referring now to FIGS. 4 and 5, it is within the scope of the present invention that two high-purity fused silica members can be stacked and laser welded or micro-bonded together. A suitable laser station is equipped with a height sensor 50 that is capable of detecting the interface between air and either the upper fused silica wafer 18 or air and the lower fused silica wafer 20. Then, knowing the thickness of the fused silica wafer 18 or 20, the intensity of the laser beam is adjusted to weld at the interface between the fused silica wafer 18 or 20 and the fused silica ring 16. It is known that air has a refractive index of 1.0 and high-purity fused silica has a refractive index of 1.45.

As shown in FIG. 5, the variations of these refractive indices can then be observed in the form of a peak formation. The laser beam can be tuned to focus on the individual peak shown in the graph plus the thickness of the wafer 20 to target the specific interface with the fused silica ring 16 during the welding process. Then, electromagnetic (EM) radiation from the laser at a given wavelength is applied to the second fused silica wafer 20 for interdiffusion of fused silica atoms to the silica atoms of the high-purity fused silica ring 16. That is how two high-purity fused silica members are micro-bonded to each other.

After the second high-purity fused silica wafer 20 is micro-bonded or micro-welded to the high-purity fused silica ring 16, the resulting subassembly is flipped over, and the first high-purity fused silica wafer 18 is micro-bonded or micro-welded to the other surface of the high-purity fused silica ring 16 using the same technique described above. The micro-bond thickness between the wafers 18 or 20 and the ring 16 ranges from about 60 μm to about 120 μm.

The third via 30 in the first ceramic wafer 18 is spaced laterally from the current collector 42 and serves as an electrolyte fill port. Positioning the third via 30 spaced from the outer edge of the cathode current collector 42 provides a space or gap between the inner major face 18C of the first ceramic wafer 18 and the cathode active material 24 so that electrolyte (not shown) can flow into the interior of the casing 12 to activate the electrode assembly 14.

The third conductive pathway 36 extending through the third via 30 in the first ceramic wafer 18 is provided with a through hole 48 serving as an electrolyte fill opening or port. An activating electrolyte (not shown) is then filled into the casing through the fill port 48. A suitable electrolyte is a non-aqueous solution containing a lithium salt selected from $LiPF_6$, $LiBF_4$, $LiAsF_6$, $LiSbF_6$, $LiClO_4$, $LiO_2$, $LiAlCl_4$, $LiGaCl_4$, $LiC(SO_2CF_3)_3$, $LiN(SO_2CF_3)_2$, $LiSCN$, $LiO_3SCF_3$, $LiC_6FSO_3$, $LiO_2CCF_3$, $LiSO_6F$, $LiB(C_6H_5)_4$, $LiCF_3SO_3$, and mixtures thereof, dissolved in a mixture of solvents including ethylene carbonate, dimethyl carbonate, ethyl methyl carbonate, diethyl carbonate, dimethoxyethane, gamma-butyrolactone and propylene carbonate, plus various additives as required.

Preferably, the fill port 48 is closed by directing a laser beam at the material comprising the conductive pathway 36, or by a closure plug (not shown) that is press-fit into the port 48.

After electrolyte filling, the electrical energy power sources are subjected to an appropriate electrical test depending on their chemistry. In one exemplary secondary electrochemical cell, a carbon/lithium nickel manganese cobalt oxide couple with a 2.5 mm diameter and a 0.7 mm height is charged to 4.2 V. The cell is then aged on open-circuit voltage (OCV) for 2 to 3 weeks after which several charge/discharge cycles between 4.2 and 3.0 V are performed at a C/5 rate.

Exemplary electrical energy power sources according to the present invention have a diameter of about 2.5 mm and a height of about 0.7 mm. The wall thickness of the ceramic ring 16 portion of the power source 10 is about 100 μm while the upper and lower plate-shaped wafers 18 and 20 have thicknesses that are ≤100 μm, but in some power sources can be as thick as about 4 mm. Thus, the efficient packaging of the miniature-sized electrical energy power sources according to the present invention results in a delivered capacity of about 300 μAh, or more.

It is appreciated that various modifications to the inventive concepts described herein may be apparent to those skilled in the art without departing from the spirit and scope of the present invention as defined by the hereinafter appended claims.

What is claimed is:

1. An electrical energy power source, comprising:
   a) casing, comprising:
      i) a first plate-shaped ceramic wafer comprising a first ceramic having a first annular peripheral edge extending to a first plate-shaped ceramic wafer upper major face spaced from a first plate-shaped ceramic wafer lower major face;
      ii) a second plate-shaped ceramic wafer comprising a second ceramic having a second annular peripheral edge extending to a second plate-shaped ceramic wafer upper major face spaced from a second plate-shaped ceramic water lower major face;
      iii) a third ceramic ring comprising a third ceramic having a third annular peripheral edge extending to a third ceramic ring upper surface spaced from a third ceramic ring lower surface,
      iv) wherein the first plate-shaped ceramic wafer lower major face is directly micro-bonded to the third ceramic ring upper surface through interdiffusion of first and third atoms comprising the respective first and third ceramics, and wherein the second plate-shaped ceramic wafer upper major face is directly micro-bonded to the third ceramic ring lower surface of the third ceramic ring through interdiffusion of second and third atoms comprising the respective second and third ceramics;
   b) a first conductive pathway extending through the first plate-shaped ceramic wafer to the first plate-shaped ceramic wafer upper and lower major faces, wherein a first current collector contacted to the first plate-shaped ceramic wafer lower major face is in electrical continuity with the first conductive pathway;
   c) a second conductive pathway extending through the second plate-shaped ceramic wafer to the second plate-shaped ceramic wafer upper and lower major faces, wherein a second current collector contacted to the second plate-shaped ceramic wafer upper major face is in electrical continuity with the second conductive pathway;
   d) an electrode assembly housed inside the casing, the electrode assembly comprising:
      i) a first active material supported on the first current collector opposite the first conductive pathway;
      ii) a second, opposite polarity active material supported on the second current collector opposite the second conductive pathway; and
      iii) a separator segregating the first active material from direct physical contact with the second active material; and
   e) an activating electrolyte filled into the casing to contact the electrode assembly,
   f) wherein the first conductive pathway serves as a first terminal, and the second conductive pathway serves as a second terminal for the power source.

2. The electrical energy power source of claim 1, wherein the ceramic material of the first and second plate-shaped ceramic wafers and of the third ceramic ring is selected from fused silica and crystalline sapphire.

3. The electrical energy power source of claim 1, wherein a thickness of the first and second plate-shaped ceramic wafers is greater than zero up to 100 μm.

4. The electrical energy power source of claim 1, wherein the first and second conductive pathways reside in respective first and second vias extending through the first and second plate-shaped ceramic wafers, the first and second vias individually having a diameter that ranges from 40 μm to 500 μm.

5. The electrical energy power source of claim 1, wherein the first and second current collectors have thicknesses that range from 0.1 μm to 100 μm.

6. The electrical energy power source of claim 1, wherein the first and second conductive pathways are selected from titanium, gold, copper, platinum, platinum alloys and platinum/ceramic mixtures.

7. The electrical energy power source of claim 1, wherein the first and second active materials individually have a thickness that ranges from 25 μm to 5,000 μm.

8. The electrical energy power source of claim 1, wherein an electrolyte fill port extends through the first plate-shaped ceramic wafer to the first plate-shaped ceramic wafer upper and lower major faces thereof, and wherein the fill port is spaced laterally from an annular edge of the first current collector.

9. The electrical energy power source of claim 1, wherein a biocompatible pad is contacted to at least one of the first plate-shaped ceramic wafer upper major face and the second plate-shaped ceramic wafer lower major face to cover the respective first and second conductive pathway.

10. The electrical energy power source of claim 1, wherein the micro-bond between the first plate-shaped ceramic wafer and the third ceramic ring and between the third ceramic ring and the second plate-shaped ceramic wafer individually have a thickness that ranges from 60 μm to 120 μm.

11. The electrical energy power source of claim 1, selected from an alkaline cell, a primary lithium cell, a rechargeable lithium-ion cell, a Ni/cadmium cell, a Ni/metal hydride cell, a supercapacitor, and a thin film solid-state cell.

12. An electrical energy power source, comprising:
   a) a first fused silica plate-shaped wafer comprising a first fused silica having a first annular peripheral edge extending to a first fused silica plate-shaped wafer upper major face spaced from a first fused silica plate-shaped wafer lower major face, wherein:

i) A first conductive pathway extends through the first fused silica plate-shaped wafer to the first fused silica plate-shaped wafer upper and lower major faces;

ii) a cathode current collector contacted to the first fused silica plate-shaped wafer lower major face is in electrical continuity with the first conductive pathway;

iii) a cathode active material is contacted to the cathode current collector opposite the first fused silica plate-shaped wafer lower major face so that the first conductive pathway serves as a cathode terminal; and iv) an electrolyte fill port extends through the first fused silica plate-shaped wafer to the first fused silica plate-shaped wafer upper and lower major faces thereof;

b) a second fused silica plate-shaped wafer comprising a second fused silica having a second annular peripheral edge extending to a second fused silica plate-shaped wafer upper major face spaced from a second fused silica plate-shaped wafer lower major face, wherein:

i) a second conductive pathway extends through the second fused silica plate-shaped wafer to the second fused silica plate-shaped wafer upper and lower major faces;

ii) an anode current collector contacted to the second fused silica plate-shaped wafer upper major face is in electrical continuity with the second conductive pathway; and iii) an anode active material is contacted to the anode current collector opposite the second fused silica plate-shaped wafer upper major face so that the second conductive pathway serves as an anode terminal; and c) a third fused silica ring comprising a third fused silica having a third annular peripheral edge extending to a third fused silica ring upper surface spaced from a third fused silica ring lower surface, d) wherein the first fused silica plate-shaped wafer lower major face is directly micro-bonded to the third fused silica ring upper surface through interdiffusion of first and third atoms comprising the respective first and third fused silicas, and the second fused silica plate-shaped water upper major face is directly micro-bonded to the third fused silica ring lower surface through interdiffusion of second and third atoms comprising the respective second and third fused silicas to thereby provide a casing for the power source;

e) a separator segregating the anode active material from direct physical contact with the cathode active material; and f) an activating electrolyte filled into the casing to contact the anode and cathode active materials.

13. The electrical energy power source of claim 12, wherein a thickness of the first and second fused silica plate-shaped wafers is greater than zero up to 100 μm.

14. The electrical energy power source of claim 12, wherein the anode and cathode current collectors have thicknesses that range from 0.1 μm to 100 μm.

15. The electrical energy power source of claim 12, wherein the first and second conductive pathways reside in respective first and second vias extending through the first and second fused silica plate-shaped wafers, the first and second vias individually having a diameter that ranges from 40 μm to 500 μm.

16. The electrical energy power source of claim 12, wherein the first and second conductive pathways are selected from titanium, gold, copper, platinum, platinum alloys and platinum/ceramic mixtures.

17. The electrical energy power source of claim 12, wherein the cathode active material has a thickness that ranges from 25 μm to 5,000 μm, and wherein the anode active material has a thickness that ranges from 25 μm to 4,000 μm.

18. The electrical energy power source of claim 12, wherein the fill port is spaced laterally from an annular edge of the cathode current collector.

19. The electrical energy power source of claim 12, wherein a biocompatible pad is contacted to at least one of the first fused silica plate-shaped wafer upper major face and the second fused silica plate-shaped wafer lower major face to cover the respective first and second conductive pathway.

20. The electrical energy power source of claim 12, wherein the micro-bond between the first fused silica plate-shaped wafer and the third fused silica ring and between the third fused silica ring and the second fused silica plate-shaped wafer individually have a thickness that ranges from 60 μm to 120 μm.

21. A method for providing an electrical energy power source, comprising the steps of:

a) providing a first ceramic host sheet comprising a first ceramic, a second ceramic host sheet comprising a second ceramic, and a third, intermediate ceramic host sheet comprising a third ceramic;

b) forming a plurality of first and second conductive pathways through the respective first and second ceramic host sheets;

c) cutting a plurality of openings in the third, intermediate ceramic host sheet;

d) contacting a plurality of first current collectors to an inner surface of the first ceramic host sheet, the first current collectors being aligned and in contact with a respective one of the first conductive pathways;

e) contacting a plurality of second current collectors to an inner surface of the second ceramic host sheet, the second current collectors being aligned and in contact with a respective one of the second conductive pathways;

f) micro-bonding the first ceramic host sheet to a lower surface of the intermediate ceramic host sheet through interdiffusion of first and third ceramic atoms comprising the respective first and third ceramics so that the plurality of first conductive pathways are aligned with a corresponding one of the openings in the intermediate ceramic host sheet;

g) supporting a plurality of first polarity active material layers on a respective one of the plurality of first current collectors opposite the corresponding plurality of first conductive pathways extending through the first ceramic host sheet;

h) positioning a plurality of separators on a corresponding one of the plurality of first polarity active material layers;

i) supporting a plurality of second, opposite polarity active material layers on a respective one of the plurality of second current collectors opposite the corresponding plurality of second conductive pathways extending through the second ceramic host sheet;

j) micro-bonding the second ceramic host sheet to an upper surface of the intermediate ceramic host sheet through interdiffusion of second and third ceramic atoms comprising the respective second and third ceramics to thereby provide a plurality of casings, each casing housing an electrode assembly comprising one of the plurality of first active material layers aligned with a respective one of the second active material layers opposite an intermediate separator;

k) providing a plurality of electrolyte fill ports in one of the first and second ceramic host sheets, the fill ports corresponding to a respective one of the plurality of casings;

l) filling an activating electrolyte into each of the plurality of casings and then closing the fill ports; and m) singulating a plurality of electrical energy power sources from the first ceramic host sheet micro-bonded to the third, intermediate ceramic host sheet in turn micro-bonded to the second ceramic host sheet, each power source comprising a casing housing an electrode assembly activated with the electrolyte, wherein the first and second conductive pathways provide opposite polarity first and second terminals for each power source.

* * * * *